United States Patent

Croker et al.

[11] Patent Number: 5,711,791
[45] Date of Patent: Jan. 27, 1998

[54] PRINTING INKS

[75] Inventors: John Croker, Broxbourne; Paula Michelle Kelly, London; Raymond David Burr, Surrey, all of England

[73] Assignee: Domino Printing Sciences Plc, England

[21] Appl. No.: 628,124

[22] Filed: Apr. 4, 1996

[30] Foreign Application Priority Data

Apr. 18, 1995 [GB] United Kingdom ............... 9507881

[51] Int. Cl.⁶ ........................... C09D 11/02; C09D 11/14
[52] U.S. Cl. .......................... 106/31.35; 106/31.36; 106/31.59; 106/31.67; 106/31.68; 106/31.89
[58] Field of Search ............................. 106/31.35, 31.36, 106/31.59, 31.67, 31.68, 31.89

[56] References Cited

U.S. PATENT DOCUMENTS

| | | | |
|---|---|---|---|
| 3,674,693 | 7/1972 | Averbach | 252/62.1 |
| 4,628,000 | 12/1986 | Talvalkar et al. | 106/22 A |
| 5,106,416 | 4/1992 | Moffatt et al. | 106/22 R |
| 5,116,409 | 5/1992 | Moffatt | 106/22 R |

FOREIGN PATENT DOCUMENTS

| | | |
|---|---|---|
| 0257454 | 3/1988 | European Pat. Off. . |
| 0514159A1 | 11/1992 | European Pat. Off. . |
| 0571190A2 | 11/1993 | European Pat. Off. . |
| 0583168A2 | 2/1994 | European Pat. Off. . |
| 21350 | 2/1984 | Japan . |
| 1441446 | 6/1976 | United Kingdom . |

OTHER PUBLICATIONS

Patent Abstract, JP59021350, Edible Printing Ink . . . , Dialog (R) File 351: Derwent WPI, Feb. 1984.
Patent Abstract, JP58089668, Printing Ink for Edible . . . , Dialog (R) File 351: Derwent WPI, May 1983.
Patent Abstract, JP 62015273, Recording Solutions, LI2, Answer 33 of 40 Caplus, Jan. 1987.
Patent Abstract, JP 57057762, Water-thinned inks for ink jet printing, LI2, Answer 39 of 40 Caplus, Apr. 1982.
Patent Abstract, JP 04332775A2, Jet Printing Inks Containing . . . , LI2, Answer 16 of 40 Caplus, Nov. 1992.
Patent Abstract, JP 06179842A2, Writing and Jet Printing Inks, L9, Answer 1 of 1 Caplus, Jun. 1994.

*Primary Examiner*—Helene Klemanski
*Attorney, Agent, or Firm*—Laff, Whitesel, Conte & Saret, Ltd.

[57] ABSTRACT

Ink jet inks are disclosed comprising a liquid vehicle which is preferably a blend of ethanol and water in a weight ratio of 23/70 (equivalent to 30/70 by volume) to 71/10 (equivalent to 90/10 by volume), a binder, which comprises a sugar or a sugar alcohol or a mixture thereof, preferably a mixture of sorbitol and maltitol, which is soluble in the liquid vehicle, a colorant which is soluble in the liquid vehicle and a surfactant comprising 90% or more of phosphatidylcholine or lysophosphatidylcholine, which is soluble in the liquid vehicle.

15 Claims, No Drawings

PRINTING INKS

BACKGROUND OF THE INVENTION

1. Field of Invention

The present invention relates to inks for ink jet printers and especially those which operate continuously. It will be described with reference to such printers but it will be appreciated that the inks described herein may also find uses in a far wider range of less demanding applications, such as drop on demand.

2. Prior Art

An ink jet printer projects from a printer head a stream of ink droplets to impact on the substrate to be marked as the substrate is conveyed, typically at high speed, past the head. The droplets are controlled, typically electrically, so that they are deposited in a controlled array and the substrate is thereby printed with a desired indicia. Typically such indicia are code numbers and letters, dates such as "sell by" dates and other alphanumeric data, such as mail addressing. Precision is clearly essential as well as high speed.

The indicia may also be purely decorative images such as cartoon characters, flowers, animals, toys and other images.

Searches of prior art have revealed a number of documents disclosing inks containing some of the ingredients of the present invention, namely JP-59021350-A (Derwent WPI Abstract Accession No. 84-065677/11), U.S. Pat. No. 3,674,693, U.S. Pat. No. 5,106,416, GB 1441446, JP-B80089668-A (Derwent WPI Abstract Accession No. 83-702654/27), EP 571190, EP 583168, EP 514159, EP 257454, JP-6179842-A2 (Chemical Abstracts 122:136368), JP-4332775-A2 (Chemical Abstracts 118:215088), JP-62015273 (Chemical Abstracts 107:156600), and JP-57057762-A2 (Chemical Abstracts 97:74093).

SUMMARY OF THE INVENTION

According to a preferred form of the present invention an ink jet ink comprises a liquid vehicle which is preferably a blend of ethanol and water in a weight ratio of 23/70 (equivalent to 30/70 by volume) to 71/10 (equivalent to 90/10 by volume), a binder, which comprises a sugar or a sugar alcohol or a mixture thereof, which is soluble in the liquid vehicle, a colorant which is soluble in the liquid vehicle and a surfactant comprising 95% or more of phosphatidylcholine or lysophosphatidylcholine, the surfactant being present in an amount such as to provide from 0.05 to 1% by weight phosphatidylcholine or lysophosphatidylcholine or mixtures thereof, which is soluble in the liquid vehicle.

Phosphatidylcholine occurs in nature in association with lysophosphatidylcholine, the former containing only fully saturated fatty acids in the molecule whilst the latter contains a proportion of unsaturated fatty acids as well. The two materials will be referred to together hereafter as PC and a reference to PC means herein phosphatidylcholine or lysophosphatidylcholine or a mixture thereof.

The binder and the colorant may only dissolve in water but so long as they will tolerate the ethanol content of the liquid vehicle and remain dissolved they are effectively soluble in the liquid vehicle.

Similarly the surfactant may only dissolve in ethanol but so long as it will tolerate the water content of the liquid vehicle and remain dissolved therein it is effectively soluble in the liquid vehicle.

The sugar is preferably sucrose.

The sugar alcohol is preferably sorbitol or maltitol.

In a preferred form of the invention the binder is a mixture of sorbitol and maltitol. The ratio of sorbitol to maltitol is preferably 1:2 or more broadly 1:1.1 to 1:2.9 e.g. 1:1.5 to 1:2.5.

The amount of binder is preferably 1 to 20% by weight more preferably 5 to 15% by weight.

The liquid vehicle is preferably a blend of ethanol and water in a 50/50 to 70/30 by volume ratio.

The surfactant preferably provides from 0.3 to 0.7% of PC and particularly provides at least 0.4% by weight of PC to the composition. We have found that at PC contents less than 0.3% the ink tends not to wet a chocolate surface whilst at PC contents above 0.7% the ink is unstable at 5° C.

The ratio of binder to PC may be in the range 10:1 to 140:1 but preferably is in the range 25:1 to 35:1 or more broadly 20:1 to 40:1.

The surfactant preferably comprises at least 95% of PC and preferably at least 98%.

In a preferred form of the invention an ink jet ink comprises 80 to 90% by weight of a liquid vehicle comprising ethanol and water, 10 to 18% of binder which is a mixture of sorbitol and maltitol, a food grade dye or mixture of dyes in an amount of 0.5 to 3.5%, 0.5 to 1.0% PC, and a conductivity agent afforded by the dye or by an added salt.

DETAILED DESCRIPTION OF THE INVENTION

Whilst the jet will be continuously operating during a printing run, the ink must also be stable physically and chemically during periods between runs.

For application of the ink to foods the ink must also be stable biologically i.e. it should be such as to suppress growth of bacteria, microbes, moulds or fungal organisms, indeed any pathogenic organism.

Ink which is not deposited on the substrate is collected automatically and recycled to a return tank. To enable the ink to be applied in this way it has to have a viscosity held to close limits. In addition in order for the ink to dry or set on the substrate it is necessary for components of the ink to evaporate off from the image on the substrate. Accordingly to maintain sufficient fluidity a make up fluid has to be added to the return tank to replace lost fluids.

Typically an ink jet ink contains a colouring agent, a liquid vehicle, and a binder which may be a polymer.

In addition, where droplet formation and control is achieved electrically, it is necessary for the ink to be electrically conductive. Conductivity may be imparted by the colouring agent when this includes a charged species. If it does not impart sufficient or any conductivity this may be provided by a conductivity controller, e.g. a species ionizable in the ink, e.g. in the liquid vehicle, such as an inorganic salt or an organic salt.

For food applications the conductivity agents are preferably simple ingestible inorganic salts such as sodium chloride.

The art is constantly striving to achieve deposits of sufficient durability on an increasing range of substrates. Some have concerned themselves with printing on glass or glazed ceramics (e.g. GB 1451937 and 1524881). Others have concerned themselves with polymer substrates such as acrylonitrile butadiene styrene polymers (ABS); polyolefins, such as polyethylene; polystyrene; polyvinyl chloride (PVC), plasticized or unplasticized; polyesters; and cellulose. Metal surfaces such as aluminium and stainless steel are also important substrates as are papers.

There is an increasing desire to be able to print on hydrophobic or oleophilic surfaces, particularly when it is desired to print on foodstuffs such as chocolate substitutes.

With regard to the colouring agent this has usually been related to the liquid vehicle. The colouring agents may be soluble in organic solvents e.g. methyl ethyl ketone, or $C_{1-5}$ alcohols e.g. methanol or ethanol (for example as industrial methylated spirits) or they may be soluble in alcohols mixed with water, or soluble in both alcohol and in water.

Examples of colouring agents which have been advocated for use in ink jet inks are dyestuffs soluble in alcohol alone such as Basic Blue 81, Solvent Orange 7 and Solvent Blue 58. Examples which are soluble in alcohol and water are Basic Violet 10, Acid Red 52, Acid Black 1, Acid Blue 59, Acid Red 73 and Acid Blue 9.

Triarylmethane dyes have also been advocated. Examples of these are Crystal Violet Fn (available from BASF) and Victoria Blue B base (available from Hilton Davis).

For application to food the dyes must be non-toxic and authorized for food grade use by the relevant authorities.

The colouring agents are employed in amounts appropriate to give the desired colour intensity in the deposit. Typically the ink contains 0.1 to 10% of the colouring agent e.g. 0.1 to 5% preferably 0.2 to 4.5%.

An ink containing a dye as colourant e.g. a yellow dye may only need to contain as little as 0.2% w/w of the dye, but for a black dye as much as 4.3% w/w may be needed.

The liquid vehicle has to be such as to impart the desired fluidity (or low viscosity) to the ink but must evaporate at a high enough rate to leave the deposited image resistant to smudging soon after it is deposited. It must also be a good enough solvent to get the colouring agent and polymer intimately admixed.

Methyl ethyl ketone (MEK) has been used very effectively in commercially available ink jet formulations, as has ethyl acetate. However, these are thought to have adverse effects on the environment. It is thus desired to replace them with other liquid vehicles. Alcohols and mixtures of alcohols and water have been advocated (see GB 1541937 and 1524881).

However MEK systems give good adhesion to many substrates and evaporates rapidly giving a short smudge time—typically the deposit becomes dry and smudge free within 2 seconds.

The binder has the function of carrying the colouring agent and adhering it to the substrate. A number of polymers have been advocated for use as binders.

Acid catalysed phenol aldehyde condensation polymers of molecular weights in the range 200–2500 which are linear and relatively free of cross linking, alcohol soluble and tolerant of dilution in water have been proposed in GB 1541937 and 1524881. Their common name is novolac resins. Polyester resins, acrylic resins e.g. styrene—(alkyl) acrylic acid copolymer resins (see GB 2053948) and polyketone resins have also been used or proposed.

For application of the ink to a food, a food grade binder authorized by the relevant authority must be used.

Conductivity controllers which have been proposed to increase conductivity include ionizable salts such as potassium thiocyanate. An example of another inorganic salt is lithium nitrate. An example of an organic ionizable salt is tetrabutyl ammonium bromide.

These can all be used in systems where the liquid vehicle is an alcohol or alcohol water mixture.

However as mentioned above for food grade uses salts such as sodium chloride need to be used.

The liquid vehicle is preferably water for food grade uses or more generally a $C_{1-5}$ alcohol e.g. methanol or ethanol and especially IMS.

The colouring agent is preferably a dyestuff soluble in the liquid vehicle, preferably water for food grade uses or more generally an alcohol soluble one, especially one soluble in IMS; however very finely divided pigments could be contemplated.

Preferred colouring agents are chrome based complex dyes such as chrome azo dyes for example Solvent Black 29. A preferred form of such chrome azo dye is Solvent Black 29 having an infra-red spectra having no significant peak in the range 1650 to 1750.

The amount of binder based on the ink by weight is preferably in the range 1 to 20% e.g. 2% to 20% or 5% to 15% especially 7% to 12%.

The amount of colouring agent based on the ink by weight is preferably in the range 0.1% to 15% e.g. 0.5% to 10% especially 4% to 7%.

The amount of liquid vehicle is typically the balance of the composition and is typically, based on the ink by weight, in the range 65% to 95%, preferably 75 to 95%.

As mentioned above the composition may also contain a conductivity controller e.g. an ionizable compound effective to make the ink of sufficient conductivity for ink jet printing.

Typically the conductivity controller may be present in an amount based on the ink by weight in the range 0.1% to 5% e.g. 0.5% to 3%, especially 0.75% to 2%.

DESCRIPTION OF PREFERRED EMBODIMENTS

The invention may be put into practice in various ways and a number of specific embodiments will be described to illustrate the invention with reference to the accompanying examples. All amounts and percentages are by weight except where otherwise stated.

EXAMPLES 1–4

Examples having the compositions given in Table 1 below were made up.

TABLE 1

|  | Example | | | |
| --- | --- | --- | --- | --- |
|  | 1 | 2 | 3 | 4 |
| Colour | Black | Blue | Red | Yellow |
| Solvent |  |  |  |  |
| Water | 37.48 | 38.28 | 38.14 | 37.42 |
| Ethanol | 44.96 | 45.92 | 45.75 | 44.88 |
| EtOH/H$_2$O ratio w/w | 55/45 | 55/45 | 55/45 | 55/45 |
| EtOH/H$_2$O ratio v/v | 60/40 | 60/40 | 60/40 | 60/40 |
| Binder (B) |  |  |  |  |
| Sorbitol (S) | 4.36 | 4.46 | 4.44 | 5.61 |
| Maltitol (M) | 8.70 | 8.88 | 8.85 | 11.22 |
| S/M ratio | 1:2 | 1:2 | 1:2 | 1:2 |
| Surfactant |  |  |  |  |
| Epikuron 200 (98% PC) | 0.49 | 0.50 | 0.50 | 0.49 |
|  | 0.48 | 0.49 | 0.49 | 0.48 |
| Ratio B/PC | 27:1 | 27:1 | 27:1 | 35:1 |
| Conductivity agent |  |  |  |  |
| Sodium chloride | 0 | 0 | 0 | 10 |

TABLE 1-continued

| | Example | | | |
|---|---|---|---|---|
| | 1 | 2 | 3 | 4 |
| Dye | | | | |
| Patent blue V | 1.91 | 1.95 | 0 | 0 |
| Carmosine | 1.49 | 0 | 1.52 | 0 |
| Ponceau 4R | 0.60 | 0 | 0.79 | 0 |
| Quinoline yellow | 0 | 0 | 0 | 0.21 |
| Sunset yellow | 0 | 0 | 0 | 0.02 |
| Total | 100 | 100 | 100 | 100 |
| Properties | | | | |
| Viscosity (1) | 4.4 | 4.1 | 4.1 | 4.5 |
| Surface tension (2) | 30 | 30 | 30 | 30 |
| Modulation | | | | |
| $V_{min}$ | 45 | 34 | 45 | 40 |
| $V_{max}$ | 163 | 115 | 131 | 143 |
| window (3) $V_{peak}$ | 110 | 96 | 100 | 103 |
| Pressure $P_{min}$ | 38 | 39 | 31 | 38 |
| window (4) $P_{max}$ | 60 | 62 | 55 | 62 |
| OTHER PROPERTIES | | | | |
| Wetting (5) | 1 | 1 | 1 | 1 |
| Solution stability (6) | | | | |
| viscosity | 4.4 | 4.1 | 4.1 | 4.5 |
| filtration | 15 | 14 | 14 | 14 |
| Low temperature | | | | |
| solution stability (7) | | | | |
| visual | 1 | 1 | 1 | 1 |
| filtration | 15 | 14 | 14 | 14 |
| Conductivity (8) | 2452 | 1140 | 1880 | 790 |
| Density (9) | 974 | 966 | 972 | 966 |

Notes on Table 1
(1) Viscosity in mPa · s (centipoise) is measured using a Brookfield Viscometer (model DV-II) with an ultra low (UL) adaptor, set to 60 r.p.m. All measurements are carried out in a thermostatically controlled water bath at 25% and ink samples are equilibrated at this temperature prior to measurement.
(2) surface tension in dynes/cm is measured using a torsion balance with a platinum ring at 25° C.
(3) modulation window: The modulation window reflects the voltages between which the ink sample under test will print in a given machine. It can thus be used to compare a series of different inks. The modulation window is measured using a standard oscilloscope connected to a standard print rig on which the inks are tested so as to measure the drive rod voltage and the phasing of the rig.
The modulation window is the difference between the minimum and the maximum voltages that can be applied to the drive rod and still produce acceptable print of fully formed characters at the optimum pressure. The optimum pressure is the mid value between the minimum and maximum pressures that produce acceptable print. Determination of modulation and pressure windows is an iterative process done at ambient temperature.
The modulation is measured in volts and indicates the difference between the lowest voltage ($V_{min}$) at which the ink sample will print and the highest voltage ($V_{max}$) at which the ink sample will print.
(4) pressure window: The printer or printer rig used to measure the modulation window is provided with an integral pressure gauge. This is used to measure the pressure window in psi. It is the difference between the lowest pressure ($P_{min}$) at which the ink sample will print and the highest pressure ($P_{max}$) at which the ink sample will print.
(5) wetting: The wetting properties were measured visually by impinging the ink on a standard hydrophobic substrate at a fixed distance (13 mms) using a fixed message. The substrate was pseudo white chocolate. The pseudo white chocolate has a molded surface having a roughened finish imparted by the smooth moulds. If the ink formed into balls on the surface it was graded 3, if it wetted the surface without any droplets remaining it was graded 1, if the appearance was between 1 and 3 it was graded 2.
(6) solution stability: This was the ability of the ink to retain its components in solution on storage at 60° C. for 8 weeks. Instability was detected by comparing filtration time and viscosity; Examples 1-4 show no deviation from initial viscosity.

TABLE 1-continued

| | Example | | | |
|---|---|---|---|---|
| | 1 | 2 | 3 | 4 |

(7) low temperature solution stability at 5° C.: The ink is placed in a glass sample jar and held at 5° C. for 12 hours. The clarity of the solution is assessed visually. If the ink was clear at 5° C., it was graded 1; if cloudy at 5° C. but no precipitate, it was graded 2; if there was some precipitate at 5° C., it was graded 3; if there was a large amount of precipitate at 5° C., it was graded 4. An ink was only considered stable if it was graded 1.
(8) Conductivity in μs/cm is measured directly using an EDT series conductivity meter (model 3 BA380) which is solvent resistant. The conductivity probe contains three graphite rings.
All measurements were carried out after calibration of the meter and equilibration of the ink in a water bath held at 25° C.
(9) Density in g/cm$^3$ is measured using a pyknometer (density bottle) at 25° C.
(10) The 98% PC content is made up of 95.5% phosphatidylcholine and 2.5% of lysophosphatidylcholine.

The inks listed above were made up using the following sequence. The water as distilled water was measured into the bowl of a food grade SILVERSON (Trade Mark) mixer. The binders were then added and stirred until they had dissolved, typically 10 minutes. The dye and salt, if used, (the dyes in Examples 1, 2 and 3 provided the necessary conductivity) were then added and stirring continued for 10–15 minutes to dissolve them. The surfactant was then predissolved in a small quantity of the ethanol. The remaining ethanol was then added to the aqueous system in the mixing bowl and then stirred in and then the ethanolic surfactant solution was added and the mixture stirred for 5 minutes. The mixture was then filtered to retain all particles above 1 micrometre absolute through a food grade filter.

EXAMPLES 5–12

Examples having the compositions given in Table 2A and 2B below were made up as described for Examples 1 to 4.

TABLE 2A

| | Example | | | |
|---|---|---|---|---|
| | 5 | 6 | 7 | 8 |
| Colour | Blue | Blue | Blue | Blue |
| Solvent | | | | |
| Water | 219 | 219 | 220 | 188 |
| Ethanol (ml) | 323 | 323 | 325.5 | 278 |
| EtOH/H$_2$O ratio v/v | 60/40 | 60/40 | 60/40 | 60/40 |
| Binder | | | | |
| Dextrose (g) | 42 | 84 | — | — |
| Sorbitol (g) | — | — | 37.8 | 119 |
| Maltitol | — | — | — | — |
| Sucrose | — | — | — | — |
| Surfactant | | | | |
| none | — | — | — | — |
| Conductivity agent | | | | |
| none | | | | |
| Dye | | | | |
| Patent blue V (g) | 12 | 12 | 12 | 12 |
| Properties | | | | |
| Viscosity (1) | 3.26 | 4.11 | 3.22 | 5.56 |
| Surface tension (2) | — | — | — | — |
| Modulation window (3) (3B) | 84 | 103 | 96 | 117 |
| Pressure window (4) (4B) | 22 | 26 | 26 | 32 |
| Wetting (5) | 3 | 3 | 3 | 3 |
| Solution stability (6) | — | — | — | — |

TABLE 2A-continued

|  | Example | | | |
|---|---|---|---|---|
|  | 5 | 6 | 7 | 8 |
| Low temperature solution stability (7) | 1 | 1 | 1 | 1 |
| Conductivity (8) | 922 | 1243 | 942 | 584 |
| Density (9) | — | — | — | — |

Notes of Table 2A
(3B) The value given is the difference between $V_{max}$ and $V_{min}$.
(4B) The value given is the difference between $P_{max}$ and $P_{min}$.

TABLE 2B

|  | Example | | | |
|---|---|---|---|---|
|  | 9 | 10 | 11 | 12 |
| Colour | Blue | Blue | Blue | Blue |
| Solvent |  |  |  |  |
| Water (ml) | 220 | 193 | 220 | 199 |
| Ethanol (ml) | 325 | 286 | 325.5 | 294 |
| EtOH/H$_2$O ratio v/v | 60/40 | 60/40 | 60/40 | 60/40 |
| Binder |  |  |  |  |
| Dextrose | — | — | — | — |
| Sorbitol | — | — | — | — |
| Maltitol (g) | 38.4 | 105.6 | — | — |
| Sucrose (g) | — | — | 37.2 | 90.6 |
| Surfactant |  |  |  |  |
| none | — | — | — | — |
| Conductivity agent |  |  |  |  |
| none | — | — | — | — |
| Dye |  |  |  |  |
| Patent blue V (g) | 12 | 12 | 12 | 12 |
| Properties |  |  |  |  |
| Viscosity (1) | 3.4 | 5.5 | 3.4 | 4.9 |
| Surface tension (2) | 37.2 | 37.2 | 37.2 | — |
| Modulation window (3) (3B) | 76 | 100 | 53 | 79 |
| Pressure window (4) (4B) | 33 | 18 | 26 | 22 |
| Wetting (5) | 3 | 3 | 3 | 3 |
| Solution stability (6) | — | — | — | — |
| Low temperature solution stability (7) | 1 | 1 | 1 | 1 |
| Conductivity (8) | 1029 | 642 | 1032 | 700 |
| Density (9) | — | — | — | — |

For good modulation and thus good printing the modulation window should be greater than 30 volts and the pressure window greater than 6 psi (0.414 bar).

Selection of Solvents

Whilst any solvent effective to bring the binder, dye, surfactant and conductivity agent into solution could be used, the primary objective of the present invention is to produce continuous ink jet ink which can be used to make coloured images on food materials. For such uses solvents accepted by the relevant health and safety authorities need to be used. For the European community acceptable candidates are ethyl acetate, diethyl ether, glycerol monoacetate, glycerol diacetate, glycerol triacetate, isopropyl alcohol, propylene glycol, acetic acid, sodium hydroxide, ammonium hydroxide, ethanol and water.

Ethanol and water are attractive on the grounds of cheapness and ease of purification. In addition mixtures of ethanol and water in certain proportions kill bacteria and microbes (self-sterilizing) e.g. 76/24 ethanol/water by volume. In lower proportions they can still prevent growth of bacteria and microbes (self-disinfecting). Proportions as low as 50/50 ethanol/water by volume are self disinfecting. Mixtures in the range 90/10 to 40/60 e.g. 80/20, or 70/30 to 40/60 could be used. Mixtures in the range 60/40 to 50/50 have the advantage of having enough ethanol to be self-disinfecting whilst having enough water to be effective solvents for components which are more readily soluble in water than in ethanol.

A preferred ratio is 60/40 ethanol/water by volume.

For non food uses on packaging Epikuron 200 is soluble in methanol, methylethylketone, ethyl acetate, isopropylalcohol and tetrahydrofuran. Selection of Wetting Agents An objective of the present invention is to produce continuous ink jet inks which produce clear images on surfaces which are difficult to wet or even are hydrophobic or oleophilic, or oily. Examples of such surfaces are those containing cocoa fat.

In addition materials which are appropriate binders and solvents for ink jet inks which are to be applied to foods tend to be essentially hydrophilic in nature.

Thus such inks tend to fail to wet and instead form discrete droplets on the surface e.g. of a chocolate substitute material. The ink "balls up" and gives poor print quality.

We have investigated a number of wetting agents which are approved for food grade use using as the solvent a 60/40 ethanol/water by volume mixture.

Polyoxyethylene (2) sorbitan monolaurate either as the Span 20 (Trade Mark) or Tween 20 (Trade Mark) materials, polyoxyethylene (20) sorbitan monostearate as the Crillet 3 (Trade Mark) material, polyoxyethylene (20) sorbitan tristearate as the Crillet 35 (Trade Mark) material, sorbitan monolaurate as the Crill 1 (Trade Mark) material, sorbitan mono-oleate as the Crill 4 (Trade Mark) material and sucroglycerides as the Celyonol (Trade Mark) SFG, MSPO11, FI and LMC materials were all incompatible with a 60/40 ethanol/water by volume mixture.

Polyoxyethylene (20) sorbitan mono-oleate as the Tween 80 (Trade Mark) or Crillet 4 (Trade Mark) materials, polyoxyethylene (20) sorbitan monolaurate as the Crillet 1 (Trade Mark) material and polyoxyethylene (20) sorbitan monopalmitate as the Crillet 2 (Trade Mark) material, whilst being compatible with the solvent failed to wet the test surface which was pseudo white chocolate (chocolate in which a proportion of the cocoa butter was replaced by vegetable fat).

We also tested commercially available fractions of lecithin such as Sternpur G (Trade Mark) sold by Stern UK Limited, 29 The Downs, Altrincham, Cheshire WA1L 2QD but found that it was insoluble in a 60/40 ethanol/water by volume mixture.

Rather than being dissuaded by this failure we sought out fractions characterised by a high phosphatidylcholine content. We found that a purified material derived from lecithin containing 98% PC (which is made up of 95.5% phosphatidylcholine and 2.5% lysophosphatidylcholine supplied as Epikuron 200 (Trade Mark) by Lucas Meyer is soluble in a 60/40 ethanol/water by volume mixture. Moreover when made up as an ink jet ink (see Example 1) it wetted the test surface (see Table 1), which was pseudo white chocolate.

However the system still presented a problem because the Epikuron 200 precipitated out of solution when stored at 5° C. for 48 hours. Whilst it redissolved when the temperature returned to room temperature (20° C.) this is an instability which would make it unacceptable in a continuous ink jet ink.

Despite this setback we continued our investigations and studied the binder for the system.

A material containing only 80% by weight phosphatidylcholine sold as EPIKURON 145 was not soluble in the 60/40 ethanol/water by volume mixture. It was soluble in ethanol but produced a precipitate on addition of water.

However pure grades lysolecithin or lysophosphatidylcholine are efffective similarly to Epikuron 200.

Selection of Binders

The function of the binder is to impart a suitable viscosity to the formulation e.g. in the range 2–10 cps at 25° C. The binder also helps secure the ink to the substrate on which it is deposited.

We tested a range of candidate food grade binders for solubility in a 60/40 ethanol/water by volume mixture and for stability of the binder solution in such a solvent to the addition of a conductivity agent, sodium chloride, to represent the salt which is present in food grade dyes and is needed to make the ink conductive and thus jettable.

The following were tested by being dissolved in water as a 20% by weight solution and then adding ethanol to make a 60/40 ethanol/water by volume mixture.

Edible starches, sodium alginate, gum arabic (acacia), carragenan, gelatin, pectins, sodium polypectate, dextrin, guar gum and locust bean gum, precipitated out.

Sodium carboxymethylcellulose and sodium alginate salted out on addition even of less than 1% by weight of sodium chloride.

Propylene glycol alginate and xanthan gum formed very high viscosity solutions with gel particles and the compositions when tried as inks had poor modulation in the printer.

Certain sugars namely sucrose and dextrose and certain sugar alcohols namely maltitol and sorbitol were soluble in the 60/40 ethanol/water by volume mixture, did not salt out on addition of 1% by weight sodium chloride and modulated well. Results with certain formulations for such materials have been given already in Table 2 above.

These sugar and sugar alcohol binders were then combined with EPIKURON 200. It was found surprisingly that when sorbitol was used as the binder the EPIKURON 200 remained in solution even when held at 5° C. for extended periods of time such as 48 hours or even three weeks. Sorbitol was found however to have a disadvantage in that when it was the sole binder it did not dry fully on the substrate. After printing the code smeared when rubbed with a dry tissue even after 24 hours drying.

We tried replacing some of the sorbitol with one of the other materials sucrose, dextrose and maltitol. Only maltitol both preserved the stabilizing effect of sorbitol on the solubility of EPIKURON 200 and gave a dry deposit. However fructose and xylose appear to have a similar effect to sorbitol whilst sucrose and glucose show the effect at higher concerntrations. Xylitol has an effect at lower concentrations but is not soluble at higher concentrations.

However where resistance to smudging is not necessary sorbitol could be used on its own.

The ink of Example 4 contains 5.6% w/w sorbitol and 11.2% w/w malitol. When smudge resistance is not needed the same solubility stability at 5° C. can be achieved by using about 18.5% w/w sorbitol on its own.

We have also studied the variation of zeta potential with time of mixtures of Epikuron 200 in 60/40 ethanol/water blends with maltitol, sucrose and sorbitol in various combinations and concentrations. We found that the systems which formed stable solutions also exhibited zeta potentials which remained below −5 mV for the duration of the test 9500 seconds (nearly 2½ hours). Those which were unstable exhibited zeta potentials above −5 mV (in the range −5 to 0 mv) over the same test period.

The following Table 2C gives the compositions of the stable materials (S1 and S2) and the unstable materials (U1, U2 and U3).

TABLE 2C

| System | S1 | S2 | U1 | U2 | U3 |
|---|---|---|---|---|---|
| Water | 45 | 45 | 45 | 45 | 45 |
| Ethanol | 55 | 55 | 55 | 55 | 55 |
| Epikuron 200 | 0.5 | 0.5 | 0.5 | 0.5 | 0.5 |
| Sorbitol | 5 | 5 | — | — | — |
| Maltitol | — | 10 | — | 10 | — |
| Sucrose | — | — | — | — | 10 |

The sorbitol and maltitol materials thus appear to have a stabilization effect on Epikuron 200 and provide systems which exhibit zeta potentials of −5 mV or less. Accordingly in a preferred form of the invention ink jet inks in accordance with the invention are characterised by the presence of a material effective to produce a system in admixture with 0.5% by weight of PC which is a mixture of 95.5% w/w phosphatidylcholine and 2.5% w/w lysophosphatidylcholine, 45% by weight water and 55% by weight ethanol which has a zeta potential of −5 mV or a more negative value and which maintains this value for at least 2 hours.

Selection of Colouring Agents

It was decided to use soluble dyes rather than pigments to avoid blockage problems in the ink jet printer.

Food grade dyes were tested for solubility in 60/40 ethanol/water by volume mixture and for stability of the solution i.e. tendency to precipitate out with time.

Natural colourants e.g. dyes could be used but they tend to have poor solubility in 60/40 ethanol/water by volume at 5° C. and their solutions tend to be unstable. An example of such a natural colourant which is a pigment is curcumin.

Curcumin is a dispersion in water which initially gives a good ink jet ink but is unstable on storage.

Table 3A below gives the name of the dye, its CI number, its E number and its maximum stability at 5° C. in 60/40 ethanol/water by volume, together with comments.

TABLE 3A

| Name of dye | Maximum % by weight | Comments |
|---|---|---|
| Curcumin CI75300 E100 | no limit | unstable |
| Riboflavin (1) E100 | 0 | solubility too low |
| Quinoline yellow CI47005 E104 | 0.65 | |
| Sunset yellow FCF CI15985 E110 | 0.75 | |
| Cochineal (Carmine) CI75470 E120 | 0.1 | solubility too low |
| Carmosine CI14720 E122 | 1.2 | |
| Ponceau 4R CI16255 E124 | 0.61 | |
| Patent Blue V CI42051 E131 | 3.5 | |

TABLE 3A-continued

| Name of dye | Maximum % by weight | Comments |
|---|---|---|
| Indigo Carmine CI73015 E132 | 0 | solubility too low |
| Brilliant Blue FCF 15 CI42090 E none | 3.5 | no E number thus can't be used for food |
| Chlorophyll CI75810 E140 | no limit | poor stability |
| Green S (Brilliant Green BS) CI44090 E142 | 3.0 | |
| Black PN CI28440 E151 | 0.2 | poor solubility |

Notes of Table 3A
(1) Riboflavan is classed as a vitamin ($B_2$) and does not have a Colour Index number.

Quinoline yellow, Sunset yellow FCF, Carmosine, Ponceau 4R and Patent blue V were selected on performance and aesthetic grounds and are used in Examples 1–4 (see Table 1 above).

For non-food purposes and with other aesthetic selection criteria other dyes could be used.

When the dyes were used in full ink formulations it was found unexpectedly that greater amounts of colourants could be brought into solution and held stable therein in the presence of the sorbitol. Thus for Quinoline yellow the maximum solubility in a system consisting of 45% by weight water, 55% ethanol, 20% sorbitol was 0.85%. For Ponceau 4R the maximum solubility in a system consisting of 45% by weight water, 55% ethanol, 20% sorbitol, was 1.15%.

Table 3B gives details of the increased dye loadings (and thus intensity of colour) which can be achieved with a number of colourants using the following ink.

The ink was made up by dissolving the dye at a range of concentrations in 40 ml of water and then slowly adding 60 ml of ethanol. Each sample was then stored at 5° C. for 24 hours and then inspected for clarity. If the sample remained clear the quantity of dye was increased by an increment. In the Table 3B the column headed "clear" was the highest concentration (% w/w) tested at which the sample remained clear; the column headed "ppt" was the concentration of the first sample which precipitated out (the last sample made for that colourant).

The experiment was then repeated but instead of pure water, 40 ml of water having 20 g of solid sorbitol dissolved in it was used.

TABLE 3B

| Colourant | EtOH water clear | 60% 40% ppt | EtOH water sorbitol clear | 60% 40% 20% ppt |
|---|---|---|---|---|
| Ponceau 4R | 1.75 | 2.0 | 5.0 | 6.0 |
| Carmoisine | 1.5 | 1.75 | 6.0 | 7.0 |
| Quinoline yellow | 0.5 | 1.0 | 1.0 | 2.0 |
| Sunset yellow | 0.5 | 1.0 | 1/5 | 2.0 |
| Patent Blue V | >9 | — | >9 | — |

TABLE 3B-continued

| Colourant | EtOH water clear | 60% 40% ppt | EtOH water sorbitol clear | 60% 40% 20% ppt |
|---|---|---|---|---|
| Brilliant black (1) | — | ppt at 0.75 | no ppt at 0.75 | — |
| Erythrosine | >9 | — | >9 | — |

Note on Table 3B
(1) The ink was opaque and the only indication of insolubility was a precipitate on the bottom of the vessel. Table 3B indicates that the presence of sorbitol allowed an increased amount of dye, but the experiment was not pursued.

EXAMPLES 13–16

Examples having the composition given in Table 4 below were made up by the procedure described for Examples 1–4.

TABLE 4

| | Example | | | |
|---|---|---|---|---|
| | 13 | 14 | 15 | 16 |
| Colour | Yellow | Yellow | Yellow | Yellow |
| Solvent (ml) | 963 | 963 | 963 | 963 |
| Water (ml) | 373 | 373 | 373 | 373 |
| Ethanol (ml) | 560 | 560 | 560 | 560 |
| EtOH/$H_2O$ ratio w/w | 55/45 | 55/45 | 55/45 | 55/45 |
| EtOH/$H_2O$ ratio v/v | 60/40 | 60/40 | 60/40 | 60/40 |
| Binder (B) (g) | 168 | 168 | 168 | 168 |
| Sorbitol (g) | 56 | 56 | 56 | 56 |
| Maltitol (g) | 112 | 112 | 112 | 112 |
| Surfactant | | | | |
| Epikuron 200 (g) | 1 | 3 | 7 | 9 |
| (PC) | 0.98 | 2.9 | 6.9 | 8.8 |
| ratio B/PC | 171:1 | 58:1 | 24:1 | 19:1 |
| Conductivity agent | | | | |
| Sodium chloride | 1 | 1 | 1 | 1 |
| Dye | | | | |
| Quinoline yellow | 3 | 3 | 3 | 3 |
| Sunset yellow | 0.2 | 0.2 | 0.2 | 0.2 |
| Properties | | | | |
| Viscosity (1) | — | — | — | 4.63 |
| Surface tension (2) | 29.9 | 29.7 | 29.9 | 29.9 |
| Modulation $V_{min}$ | 45 | 60 | 61 | 54 |
| window (3) $V_{max}$ | 139 | 142 | 170 | 190 |
| $V_{peak}$ | 100 | 105 | 120 | 140 |
| Pressure $P_{min}$ | 30 | 34 | 32 | 36 |
| window (4) $P_{max}$ | 62 | 64 | 62 | 62 |
| Wetting (5) | 1(2) | 1 | 1 | 1 |
| Solution stability (6) | — | — | — | — |
| Low temperature solution stability (7) | 1 | 1 | 2 | 2 |
| Conductivity (8) | | | | 705 |
| Density (9) | | | | 976.5 |

EXAMPLES 17–20

Examples having the composition given in Table 5 below were made up by the procedure described for Examples 1–4.

TABLE 5

| | Example | | | |
|---|---|---|---|---|
| | 17 | 18 | 19 | 20 |
| Colour | Yellow | Yellow | Yellow | Yellow |
| Solvent | 993 | 933 | 933 | 933 |
| Water (ml) | 466.5 | 466.5 | 466.5 | 466.5 |
| Ethanol (ml) | 466.5 | 466.5 | 466.5 | 466.5 |
| EtOH/H$_2$O ratio w/w | . | . | . | . |
| EtOH/H$_2$O ratio v/v | 50/50 | 50/50 | 50/50 | 50/50 |
| Binder (B) | | | | |
| Sorbitol (g) | 56 | 56 | 56 | 56 |
| Maltitol (g) | 112 | 112 | 112 | 112 |
| Surfactant | | | | |
| Epikuron 200 (g) | 1 | 3 | 5 | 7 |
| (PC) | 0.98 | 2.9 | 4.9 | 6.9 |
| ratio B/PC | 171:1 | 58:1 | 34:1 | 24:1 |
| Conductivity agent | 1 | 1 | 1 | 1 |
| Dye | | | | |
| Quinoline yellow (g) | 3 | 3 | 3 | 3 |
| Sunset yellow (g) | 0.2 | 0.2 | 0.2 | 0.2 |
| Properties | | | | |
| Viscosity (1) | — | — | — | — |
| Surface tension (2) (2B) | 31.5 | 31.3 | 31.2 | 30.9 |
| Modulation $V_{min}$ | 38 | (poor print quality) | | |
| window (3) $V_{max}$ | 88 | (poor print quality) | | |
| $V_{peak}$ | 72 | (poor print quality) | | |
| Pressure $P_{min}$ | 34 | (poor print quality) | | |
| window (4) $P_{max}$ | 10 | (poor print quality) | | |
| Wetting (5) | 2 | (poor print quality) | | |
| Solution stability (6) | | | | |
| Low temperature solution stability (7) | 3 | 3 | 3 | 3 |
| Conductivity (8) | . | . | . | . |
| Density (9) | . | . | . | . |

Notes on Table 5
(2B) It will be noted that the surface tension of the inks of Examples 17–20 does not decrease significantly as the concentration of PC increases. There is no step decrease and these inks are all below the critical miscelle concentration.

EXAMPLES 21–24

Examples having the composition given in Table 6 below were made up by the procedure described for Examples 1–4.

TABLE 6

| | Example | | | |
|---|---|---|---|---|
| | 21 | 22 | 23 | 24 |
| Colour | Yellow | Yellow | Yellow | Yellow |
| Solvent | | | | |
| Water (ml) | 466.5 | 148 | 148 | 148 |
| Ethanol (ml) | 466.5 | 342 | 342 | 342 |
| EtOH/H$_2$O ratio w/w | | | | |
| EtOH/H$_2$O ratio v/v | 50/50 | 70/30 | 70/30 | 70/30 |
| Binder (B) | | | | |
| Sorbitol (g) | 56 | 28 | 28 | 28 |
| Maltitol (g) | 112 | 56 | 56 | 56 |
| Surfactant | | | | |
| Epikuron 200 (g) | 9 | 0.5 | 1.5 | 2.5 |
| (PC) | 8.82 | 0.49 | 1.47 | 2.45 |
| ratio B/PC | 19:1 | 165:1 | 57:1 | 30.5:1 |
| Conductivity agent | | | | |
| Sodium chloride (g) | 1 | 0.5 | 1.5 | 2.5 |
| Dye | | | | |
| Quinoline yellow (g) | 3 | 1.5 | 1.5 | 1.5 |
| Sunset yellow (g) | 0.2 | 0.1 | 0.1 | 0.1 |
| Properties | | | | |
| Viscosity (1) | 4.88 | — | — | — |
| Surface tension (2) (2B) | — | 29.16 | 29.00 | 28.60 |
| Modulation | | | | |
| $V_{min}$ | poor | 53 | 43 | 60 |
| $V_{max}$ | print | >220 | >220 | >220 |
| window (3) $V_{peak}$ | quality | 138 | 120 | 120 |
| Pressure $P_{min}$ | — | 38 | 38 | 38 |
| window (4) $P_{max}$ | — | 60 | 62 | 64 |
| Wetting (5) | — | 2 | 1 | 1 |
| Solution stability (6) | | | | |
| Low temperature solution stability (7) | 4 | 1 | 1 | 1 |
| Conductivity (8) | 807 | — | — | — |
| Density (9) | 997 | — | — | — |

EXAMPLES 25–28

Examples having the composition given in Table 7 below were made up by the procedure described for Examples 1–4.

TABLE 7

| | Example | | | |
|---|---|---|---|---|
| | 25 | 26 | 27 | 28 |
| Colour | Yellow | Yellow | Yellow | Yellow |
| Solvent | | | | |
| Water (ml) | 148 | 148 | 294 | 343 |
| Ethanol (ml) | 342 | 342 | 196 | 174 |
| EtOH/H$_2$O ratio w/w | | | | |
| EtOH/H$_2$O ratio v/v | 70/30 | 70/30 | 40/60 | 30/70 |
| Binder (B) | | | | |
| Sorbitol (g) | 28 | 28 | 28 | 28 |
| Maltitol (g) | 56 | 56 | 56 | 56 |
| Surfactant | | | | |
| Epikuron 200 (g) | 3.5 | 4.5 | 2.5 | 2.5 |
| (PC) | 3.43 | 4.41 | 2.45 | 2.45 |
| ratio B/PC | 24.5:1 | 19:1 | 34:1 | 34:1 |
| Conductivity agent | | | | |
| Sodium chloride (g) | 0.5 | 0.5 | 0.5 | 0.5 |
| Dye | | | | |
| Quinoline yellow (g) | 1.5 | 1.5 | 1.5 | 1.5 |
| Sunset yellow (g) | 0.1 | 0.1 | 0.1 | 0.1 |
| Properties | | | | |
| Viscosity (1) | — | 4.59 | 4.49 | 3.84 |
| Surface tension (2) (2B) | 29.30 | 29.00 | 31.37 | 32.63 |
| Modulation | | | | |
| $V_{min}$ | 55 | 65 | 31 | 17 |
| $V_{max}$ | >220 | >220 | 98 | 88 |
| window (3) $V_{peak}$ | 100 | 105 | 68 | 50 |
| Pressure $P_{min}$ | 38 | 38 | 36 | 36 |
| window (4) $P_{max}$ | 62 | 60 | 68 | 68 |
| Wetting (5) | 1 | 1 | 1 | 1 |
| Solution stability (6) | — | — | — | — |

TABLE 7-continued

|  | Example | | | |
|---|---|---|---|---|
|  | 25 | 26 | 27 | 28 |
| Low temperature solution stability (7) | 1 | 1 | 2 | 2 |
| Conductivity (8) | — | 507 | 937 | 1031 |
| Density (9) | — | 955 | 1013 | 1018 |

Examples 27 and 28 show poor low temperature stability.

Example 2, Example 6 (without lecithin) and Examples 29 which is Example 2 with the EPIKURON 200 replaced by 0.5% laboratory grade lysolecithin (which is 99%+ lysophosphatidylcholine) type 1 from egg yolk were made up.

They were then tested for their ability to wet various substrates, the results being given in Table 8, and the wetting grading as being given for Table 1 note (5).

TABLE 8

| Substrate | 2 | 29 | 6 |
|---|---|---|---|
| Uncoated Cellulose - 300P | 1 | 1 | 1 |
| Treated Polyester - Melinex 505 | 3 | 2 | 2 |
| Untreated Polyester - Melinex 0 | 2 | 1 | 3 |
| Plasticized PVC - Fromotan | 1 | 1–2 | 3 |
| Unplasticized PVC - Stausen | 1 | 2 | 1 |
| Corona Treated polythene | 1 | 1–2 | 3 |
| Untreated polythene - Duraphane | 1 | 1 | 3 |
| Uncoated OPP - MG30 | 3 | 2 | 3 |
| Low density polythene - LDPE | 1 | 1 | 3 |
| Polypropylene | 3 | 1 | 3 |
| Extruded PVC | 1 | 1 | 3 |
| Pressed PVC | 1 | 1 | 2 |
| Polycarbonate | 1 | 1 | 3 |
| Polystyrene | 1 | 1 | 3 |
| Polyamide - Nylon | 1 | 1 | 1 |
| ABS | 1 | 1 | 1 |
| Acrylic - Perspex | 1 | 1 | 2 |
| Commercial Neoprene | 1 |  | 3 |
| Tin | 1 | 1 | 3 |
| Enamel Coated Steel | 1 | 2 | 3 |
| Aluminium | 1 | 2 | 3 |
| Stainless Steel | 3 | 2 | 2 |
| Mild Steel | 2 | 1 | 2 |
| Glass | 2 | 1–2 | 3 |
| Greaseproof Paper | 1 | 1 | 1 |
| Alcan Freshwrap | 1 | 1 | 3 |
| Tesco Margarine | 2 | 1–2 | 3 |
| Nestle White Chocolate Smooth | 3 | 3 | 3 |
| Cadburys White Chocolate Finger | 1 | 1 | 3 |
| Tesco White Chocolate Wafers | 1 | 1 | 1 |
| Tesco Mature Cheddar Cheese | 3 | 1–2 | 1 |
| Tesco White Chocolate | 3 | 3 | 3 |
| Nestle White Chocolate Rubbed | 1 | 1 | 2 |
| Bacon Rind | 1 | 1 | 1 |
| Kit-Kat Chocolate (Dark) | 1 | 1 | 3 |
| Tesco Waxed Milk Carton | 1 | 1–2 | 3 |

We claim:

1. An ink jet ink comprising a liquid vehicle, 1 to 20% by weight of a binder which is soluble in the liquid vehicle, a colorant which is soluble in the liquid vehicle and a surfactant comprising at least 95% of phosphatidylcholine or lysophosphatidylcholine, and the said surfactant being present in an amount such as to provide from 0.05 to 1.0% by weight phosphatidylcholine or lysophosphatidyl choline or mixtures thereof, the said surfactant being soluble in the liquid vehicle, the binder being selected from the group consisting of a sugar, a sugar alcohol and a mixture thereof.

2. An ink jet ink as claimed in claim 1 in which the liquid vehicle is a blend of a lower alkanol and water in a weight ratio of 25/75 to 90/10.

3. An ink jet ink as claimed in claim 1 in which the sugar is sucrose.

4. An ink jet ink as claimed in claim 1, 2 or 3 in which the sugar alcohol is sorbitol or maltitol.

5. An ink jet ink as claimed in claim 1, 2 or 3 in which the binder is a mixture of sorbitol and maltitol.

6. An ink jet in as claimed in claim 5 in which the ratio by weight of sorbitol to maltitol is 1:1.1 to 1:2.9.

7. An ink jet ink as claimed in anyone of claims 1 to 3 in which the liquid vehicle is a blend of ethanol and water in a 50/50 to 70/30 by volume ratio.

8. An ink jet as claimed in anyone of claims 1 to 3 in which the ratio by weight of binder to phosphatidylcholine is in the range 140:1 to 10:1.

9. An ink jet in as claimed in anyone of claims 1 to 3 in which the ratio by weight of binder to phosphatidylcholine is in the range 20:1 to 40: 1.

10. An ink jet ink which comprises 80 to 90% by weight of a liquid vehicle comprising ethanol and water, 10 to 18% by weight of binder which is a mixture of sorbitol and maltitol, a food grade dye or mixture of dyes in an amount of 0.5 to 3.5% by weight, 0.1 to 1.0% by weight phosphatidylcholine, and a conductivity agent afforded by the dye or by an added salt.

11. An ink jet ink characterized by the presence of a material effective to produce a system in admixture with 0.5% by weight of phosphatidylcholine or lysophosphatidylcholine or a mixture thereof which is a mixture of 95.5% w/w phosphatidylcholine and 2.5% w/w lysophosphatidylcholine, 45% by weight water and 55% by weight ethanol wherein the said ink has a zeta potential of −5 mV or a more negative value and which maintains this value for at least 2 hours.

12. The ink jet ink of claim 1 comprising:

1–18% by weight of a binder selected from the group consisting of a sugar, a sugar alcohol and a mixture thereof, 0.05 to 1.0% by weight of choline selected from the group consisting of phosphatidylcholine, lysophatidylcholine and mixtures thereof; and said liquid vehicle being a lower alkanol.

13. The ink jet ink of claim 12 wherein the liquid vehicle is a blend of lower alkanol and water in a 50/50 to 70/30 by value ratio.

14. The ink jet ink of claim 13 wherein there is 10–18% by weight of binder.

15. The ink jet ink of claim 14 wherein the binder is selected from the group consisting of sorbitol, maltitol and mixtures thereof.

* * * * *